(12) United States Patent
Pudelski et al.

(10) Patent No.: US 6,412,468 B1
(45) Date of Patent: Jul. 2, 2002

(54) METHOD OF OPERATING AN INTERNAL COMBUSTION ENGINE

(75) Inventors: John Kent Pudelski, Cleveland Heights; William Bricker Chamberlin, III, Kirtland, both of OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/727,618

(22) Filed: Dec. 1, 2000

Related U.S. Application Data (63) Continuation-in-part of application No. 09/664,834, filed on Sep. 19, 2000.

(51) Int. Cl.$^7$ ................................................. F01L 1/02
(52) U.S. Cl. ................................ 123/196 R; 123/90.33
(58) Field of Search ....................... 123/196 R, 196 M, 123/196 S, 196 L, 73 AD, 90.33; 184/6.5–6.9, 1.5, 24; 252/25, 29, 12

(56) References Cited

U.S. PATENT DOCUMENTS

| | | | |
|---|---|---|---|
| 4,392,463 A | | 7/1983 | Yasuhara |
| 4,869,346 A | * | 9/1989 | Nelson ........................ 184/1.5 |
| 5,195,474 A | | 3/1993 | Urata et al. |
| 5,313,919 A | * | 5/1994 | Rao et al. ................. 123/193.4 |
| 5,358,753 A | | 10/1994 | Rao et al. |
| 5,390,762 A | | 2/1995 | Nelson |
| 5,406,917 A | | 4/1995 | Rao et al. |
| 5,408,964 A | * | 4/1995 | Rao ........................ 123/193.2 |
| 5,439,605 A | * | 8/1995 | Khorramian ............... 252/33.3 |
| 5,482,637 A | | 1/1996 | Rao et al. |
| 5,555,858 A | | 9/1996 | Katoh |
| 5,595,964 A | | 1/1997 | Bardasz et al. |

(List continued on next page.)

FOREIGN PATENT DOCUMENTS

| | | |
|---|---|---|
| DE | 195 48 718 C1 | 5/1997 |
| FR | 2 605 677 | 10/1986 |
| GB | 2315812 A | 2/1998 |
| WO | 97/13884 | 4/1997 |

OTHER PUBLICATIONS

U.S. application Ser. No. 09/664,834, filed Sep. 19, 2000.
U.S. application Ser. No. 09/727,622, filed Dec. 1, 2000.

(List continued on next page.)

*Primary Examiner*—Marguerite McMahon
(74) *Attorney, Agent, or Firm*—Neil A. DuChez; David M. Shold; Michael F. Esposito (57) ABSTRACT

This invention relates to a method of operating an internal combustion engine comprising a valve train, said method comprising: (A) operating said engine using a normally liquid or gaseous fuel; (B) lubricating components of said valve train using a solid film lubricant; and (C) lubricating said engine, including said components of said valve train, using a low-phosphorus or phosphorus-free lubricating oil composition, said low-phosphorus or phosphorus-free lubricating oil composition optionally containing an extreme-pressure additive comprised of metal and phosphorus, provided the amount of phosphorus contributed to said low-phosphorus or phosphorus-free lubricating oil composition by said extreme-pressure additive does not exceed about 0.08% by weight based on the weight of said low-phosphorus or phosphorus-free lubricating oil composition. In one embodiment, the inventive method further comprises the following additional steps: (D) removing part of said low-phosphorus or phosphorus-free lubricating oil composition from said engine, said removed part of said low-phosphorus or phosphorus-free lubricating oil composition (i) being combined with said fuel and consumed with said fuel as said engine is operated or (ii) being combined with the exhaust gas from said engine and removed from said engine with said exhaust gas; and (E) adding an additional amount of said low-phosphorus or phosphorus-free lubricating oil composition to said engine to replace said removed part of said low-phosphorus or phosphorus-free lubricating oil composition.

48 Claims, 2 Drawing Sheets

U.S. PATENT DOCUMENTS

| | | | |
|---|---|---|---|
| 5,709,186 A | | 1/1998 | Taue |
| 5,720,249 A | | 2/1998 | Betts et al. |
| 5,840,672 A | | 11/1998 | Gatto |
| 5,934,236 A | * | 8/1999 | Rao et al. ................ 123/90.51 |
| 5,995,403 A | | 11/1999 | Wong |
| 6,001,783 A | * | 12/1999 | Manka et al. ................ 508/428 |
| 6,197,370 B1 | * | 3/2001 | Rao et al. .................... 427/236 |

OTHER PUBLICATIONS

U.S. application Ser. No. 09/728,006, filed Dec. 1, 2000.

U.S. application Ser. No. 09/729,519, filed Dec. 4, 2000.

McGeehan et al.; "Gasoline–Engine Camshaft Wear: The Culprit is Blow–By"; *SAE Technical Paper Series*, Paper No. 892112.

Saunders; "Engine Makers Show Extended Drain Tunnel Vision"; *Hart's Lubricants World*, Jun. 1997, pp. 14–17.

Cummins Engine Inc., Cummins Centinel™ Advanced Engine Oil Management System, http://cecoewww.cummins.com/partserv/centinel.html, Jul. 1, 1999.

Webb Enterprises, Inc., Product Literature entitled "Webb Dial Your Oil Change".

Power Plus Corporation, Product Literature entitled "Ren Model 119 Burnoff Continuous Oil Change System".

Schneider; "The Friction Factor"; *BMW Magazine*; pp. 83–85.

Rao et al.; "1.8L Sierra–Mondeo Turbo–Diesel Valvetrain Friction Reduction Using a Solid Film Lubricant"; *SAE Technical Paper Series*; Paper No. 941986.

Rao et al.; "Engine Studies of Solid Film Lubricant Coated Pistons"; *SAE Technical Paper Series*; Paper No. 970009.

Rao et al.; "Material Systems for Cylinder Bore Applications—Plasma Spray Technology"; *SAE Technical Paper Series*; Paper No. 970023.

Rao et al.;"Influence of Surface Characteristics and Oil Viscosity on Friction Behavior of Rubbing Surfaces in Reciprocating Engines"; Paper No. 98–ICE–131; ICE–vol. 31–2, 1998 Fall Technical Conference, ASME 1998.

\* cited by examiner

METHOD OF OPERATING AN INTERNAL COMBUSTION ENGINE

This application is a continuation-in-part of U.S. Application Ser. No. 09/664,834 filed Sep. 19, 2000. The disclosure in this prior application is incorporated herein by reference in its entirety.

TECHNICAL FIELD

This invention relates to a method of operating an internal combustion engine. More particularly, this invention relates to a method of operating an internal combustion engine that includes lubricating the high wear areas of the engine (e.g., wear interfaces or contacts of valve train components such as cam lobes, tappets, followers, valve tips, rocker arms, rocker arm mechanisms, and the like) with a solid film lubricant, and lubricating the entire engine, including the high wear areas, using a low-phosphorus or phosphorus-free lubricating oil composition. In one embodiment, this invention also relates to a method of operating the foregoing engine that provides an increase in the time intervals required between oil changes.

BACKGROUND OF THE INVENTION

A problem associated with internal combustion engines equipped with exhaust gas aftertreatment devices (e.g., catalytic converters, particulate traps, etc.) is that the lubricating oils for such engines are used in both the crankcase as well as in high wear areas such as the valve train. Because these oils are used in high wear areas they typically contain extreme pressure (EP) agents which typically contain metal and phosphorus (e.g., zinc dialkyl dithiophosphate) in order to be effective. During the operation of the engine these EP agents decompose and the resulting decomposition products eventually enter the aftertreatment device and often contribute to damaging the device. The problem therefore is to provide a lubricant system that adequately addresses the antiwear protection needs of the high wear areas of the engine and yet avoids damage to the exhaust gas aftertreatment device.

Another problem associated with conventional internal combustion engines is that blow-by exhaust gases generated in the crankcase of the engine typically come into contact with the valve train system. Blow-by exhaust gases have been found to be a primary factor affecting valve train wear. The problem therefore is to provide a lubricant system that avoids or reduces valve train wear.

Another problem associated with conventional internal combustion engines is that the time interval required between oil changes typically is less than the time interval required for other service items such as air filter replacements, coolant changes, brake replacements, and the like. Oil changes are viewed as one of the most aggravating and, in some cases, most costly maintenance aspects of vehicle ownership. Traditionally, oil change intervals have been extended by base stock and additive upgrades. Since the 1920s, for example, the extensions have been about 15× or greater. Regardless of this progress, the time intervals required between oil changes continue to lag behind the time intervals required for other service items. The problem therefore is to improve the lubricant technology for these engines so that the time intervals between oil changes can be extended to coincide with other service intervals.

The present invention provides a solution to each of these problems. With the present invention low-phosphorus or phosphorus-free lubricating oil compositions characterized by a low-level or absence of EP agents containing metal and phosphorus are used and as a result the exhaust gas aftertreatment device is protected from harmful exposure to the decomposition products of these agents. The use of these low-phosphorus or phosphorus-free lubricating oil compositions in all parts of the engine, including the high wear areas of the engine, is possible due to the use of solid film lubricants in the high wear areas. In accordance with one embodiment of the invention, the required oil change intervals for these engines are extended due to the fact that used engine oil is continuously or periodically removed from the engine and replaced with new oil.

The use of solid film lubricants is known. U.S. Pat. No. 5,482,637 discloses the use of thin anti-friction films comprised of at least two solid lubricants selected from graphite, $MoS_2$, and BN. U.S. Pat. No. 5,358,753 discloses the use of an anti-friction film comprised of graphite and $MoS_2$. International Publication WO 97/13884 discloses a composite coating of a metal and an oxide of the metal wherein the oxide has a lower oxygen content than any of the metal's oxide forms, the metal being selected from Ni, Cu, Mo, Fe or an alloy thereof. German Patent DE 195 48 718 Cl discloses the use of a solid film lubricant comprised of a metal oxide coating wherein the metal is Ti, Al, Mo, V or Cr.

U.S. Pat. No. 4,392,463 discloses a diesel engine having a first lubrication system, containing conventional engine oil, used to lubricate that section of the engine subjected to excessive wear-the valve train including the cam shaft, valve lifters, rocker arm, valve stems, etc., and a second lubricant system, utilizing diesel fuel, for lubricating the remaining section of the engine-the crankshaft and associated parts, pistons, connecting rods, etc. By being exposed to crankcase blowby exhaust gases, diesel fuel used to lubricate the crankshaft, etc. absorbs pollutants and contaminants contained therein and recirculates these contaminants through the fuel system to be burned and exhausted. By constantly being lubricated with fresh lubricant, wear on these specific parts is reduced. The reference indicates that frequent lubrication changes have been eliminated because the diesel fuel/lubricant is continuously changed and circulated through the fuel system. Since the engine oil and the first lubrication system is not exposed to crankcase blowby exhausted gases, its useful life is prolonged, thus reducing the frequency of required oil changes.

SUMMARY OF THE INVENTION

This invention relates to a method of operating an internal combustion engine comprising a valve train, said method comprising:

(A) operating said engine using a normally liquid or gaseous fuel;

(B) lubricating components of said valve train using a solid film lubricant; and (C) lubricating said engine, including said components of said valve train, using a low-phosphorus or phosphorus-free lubricating oil composition, said low-phosphorus or phosphorus-free lubricating oil composition optionally containing an extreme-pressure additive comprised of metal and phosphorus, provided the amount of phosphorus contributed to said low-phosphorus or phosphorus-free lubricating oil composition by said extreme-pressure additive does not exceed about 0.08% by weight based on the weight of said low-phosphorus or phosphorus-free lubricating oil composition.

In one embodiment, the inventive method further comprises the following additional steps:

(D) removing part of said low-phosphorus or phosphorus-free lubricating oil composition from said engine, said removed part of said low-phosphorus or phosphorus-free lubricating oil composition (i) being combined with said fuel and consumed with said fuel as said engine is operated or (ii) being combined with the exhaust gas from said engine and removed from said engine with said exhaust gas; and (E) adding an additional amount of said low-phosphorus or phosphorus-free lubricating oil composition to said engine to replace said removed part of said low-phosphorus or phosphorus-free lubricating oil composition.

BRIEF DESCRIPTION OF THE DRAWINGS

In the annexed drawings, like parts and features have like references.

DESCRIPTION OF THE PREFERRED EMBODIMENTS

The term "solid film lubricant" refers to a solid film layer that when adhered to wear interfaces or contacts reduces friction at such wear interfaces or contacts.

The term "low-phosphorus" refers to a material that has a phosphorus content that does not exceed about 0.08% by weight, and in one embodiment does not exceed about 0.07% by weight, and in one embodiment does not exceed about 0.06% by weight, and in one embodiment does not exceed about 0.05% by weight, and in one embodiment does not exceed about 0.04% by weight, and in one embodiment does not exceed about 0.035% by weight, and in one embodiment does not exceed about 0.03% by weight, and in one embodiment does not exceed about 0.025% by weight, and in one embodiment does not exceed about 0.02% by weight, and in one embodiment does not exceed about 0.015% by weight, and in one embodiment does not exceed about 0.01% by weight.

The term "low-ash" refers to a material that when tested pursuant to the procedures in ASTM D874-96 provides a metal-containing ash content of up to about 2% by weight, and in one embodiment up to about 1.5% by weight, and in one embodiment up to about 1% by weight, and in one embodiment up to about 0.6% by weight.

The term "ashless" refers to a material that when tested pursuant to the procedures in ASTM D874-96 does not produce a metal-containing ash. The ashless lubricating oil compositions are so called despite the fact that, depending on their constitution, they may upon combustion yield a non-volatile, non-metal containing material such as boric oxide, phosphorus pentoxide or silicon oxide.

The term "exhaust gas aftertreatment device" is used herein to refer to any device used in the exhaust gas system of an internal combustion engine to reduce pollutants in the exhaust gas. These include catalytic converters, particulate traps, catalyzed traps, and the like.

The term "consumable oil" is used herein to refer to an oil composition that may be either (i) mixed with and consumed with the fuel composition used in the inventive method, or (ii) mixed with the exhaust gas produced during the operation of the inventive method and removed from the engine with the exhaust gas as the inventive method is performed.

The term "non-consumable oil" is used herein to refer to an oil composition that is not a consumable oil.

The term "hydrocarbyl" denotes a group having a carbon atom directly attached to the remainder of the molecule and having a hydrocarbon or predominantly hydrocarbon character within the context of this invention. Such groups include the following:

(1) Purely hydrocarbon groups; that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic groups, and the like, as well as cyclic groups wherein the ring is completed through another portion of the molecule (that is, any two indicated substituents may together form an alicyclic group). Such groups are known to those skilled in the art. Examples include methyl, ethyl, octyl, decyl, octadecyl, cyclohexyl, phenyl, etc.

(2) Substituted hydrocarbon groups; that is, groups containing non-hydrocarbon substituents which do not alter the predominantly hydrocarbon character of the group. Those skilled in the art will be aware of suitable substituents. Examples include hydroxy, nitro, cyano, alkoxy, acyl, etc.

(3) Hetero groups; that is, groups which, while predominantly hydrocarbon in character, contain atoms other than carbon in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbyl group.

Terms such as "alkyl-based," "aryl-based," and the like have meanings analogous to the above with respect to alkyl groups, aryl groups and the like.

The term "hydrocarbon-based" has the same meaning and can be used interchangeably with the term hydrocarbyl when referring to molecular groups having a carbon atom attached directly to the remainder of a molecule.

The term "lower" as used herein in conjunction with terms such as hydrocarbyl, alkyl, alkenyl, alkoxy, and the like, is intended to describe such groups which contain a total of up to 7 carbon atoms.

The term "oil-soluble" refers to a material that is soluble in mineral oil to the extent of at least about one gram per liter at 25° C.

The inventive method will be initially discussed with reference to the drawings. The engines 10 (FIG. 1), 10A (FIG. 2) and 10B (FIG. 3) may be spark ignition internal combustion engines, which may be referred to as gasoline engines, or compression ignition internal combustion engines, which may be referred to as diesel engines. The spark ignition engine may be a four-stroke internal combustion engine. The engines 10, 10A and 10B are entirely conventional with the exception that high wear areas or components of these engines are lubricated using a solid film lubricant. The solid film lubricant may be applied to the desired engine components by the engine manufacturer. Among the high wear areas or components of the engines that may be so lubricated are wear interfaces or contacts in the valve train. These include the wear interfaces or contacts of the cam lobes, tappets, followers, valve tips, rocker arms, or rocker arm mechanisms, and the like. Additional engine components that may be lubricated in this manner include the wear interfaces or contacts of the cylinder bores, cylinder walls, piston rings, skirts, bearings, connecting rods, and the like.

Figure 1:
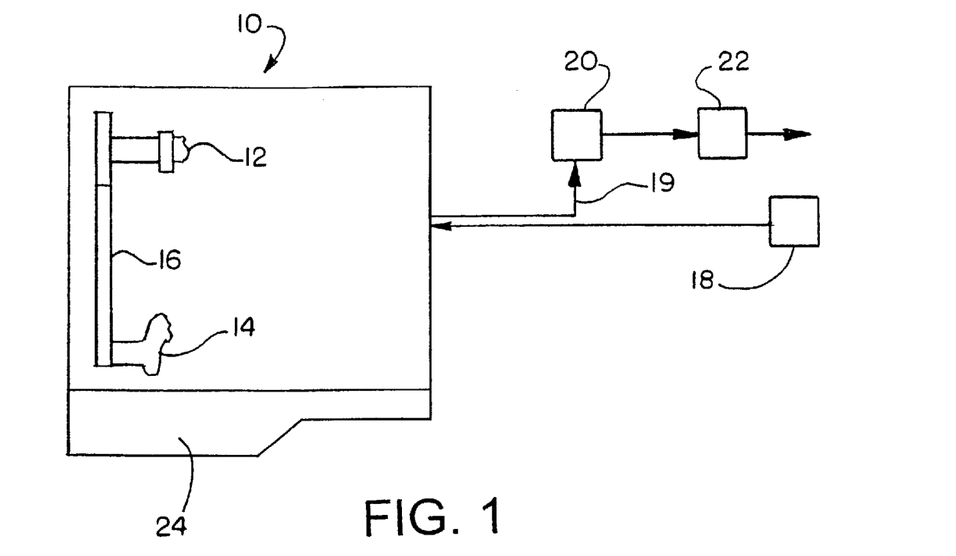
FIG. 1 is a schematic illustration of an internal combustion engine that is useful in accordance with an embodiment of the inventive method, said engine being equipped with an exhaust gas aftertreatment device.

Referring to FIG. 1, the engine 10 includes a valve train 12 and a crankshaft 14 which are connected by a timing chain 16. A fuel system 18, which includes a fuel tank, fuel pump, fuel injectors, fuel filter, and the like, is provided for advancing fuel to the engine. The fuel mixes with air, and undergoes combustion in the combustion chambers of the engine. An exhaust gas is removed from the engine as indicated by arrow 19. An exhaust gas aftertreatment device 20 (e.g., catalytic converter, particulate trap, catalyzed trap, and the like) and an exhaust muffler 22 are provided as part of an exhaust system for removing exhaust gas from the engine. The engine 10 includes a pump (not shown) for circulating oil throughout the engine and an oil sump 24.

The low-phosphorus or phosphorus-free lubricating oil composition used in the engine 10 may be a consumable oil composition or a non-consumable oil composition. The engine 10 operates in the normal sequence with the fuel being advanced from the fuel system 18 to the combustion chambers of the engine where a mixture of the fuel and air undergoes combustion. The exhaust gas from the engine is removed through the exhaust gas aftertreatment device 20 and exhaust muffler 22. During the operation of this engine, the low-phosphorus or phosphorus-free lubricating oil composition circulates through the engine in the normal manner lubricating all of the engine components, including the high wear areas or components of the engine being lubricated with the solid film lubricant.

Figure 2:
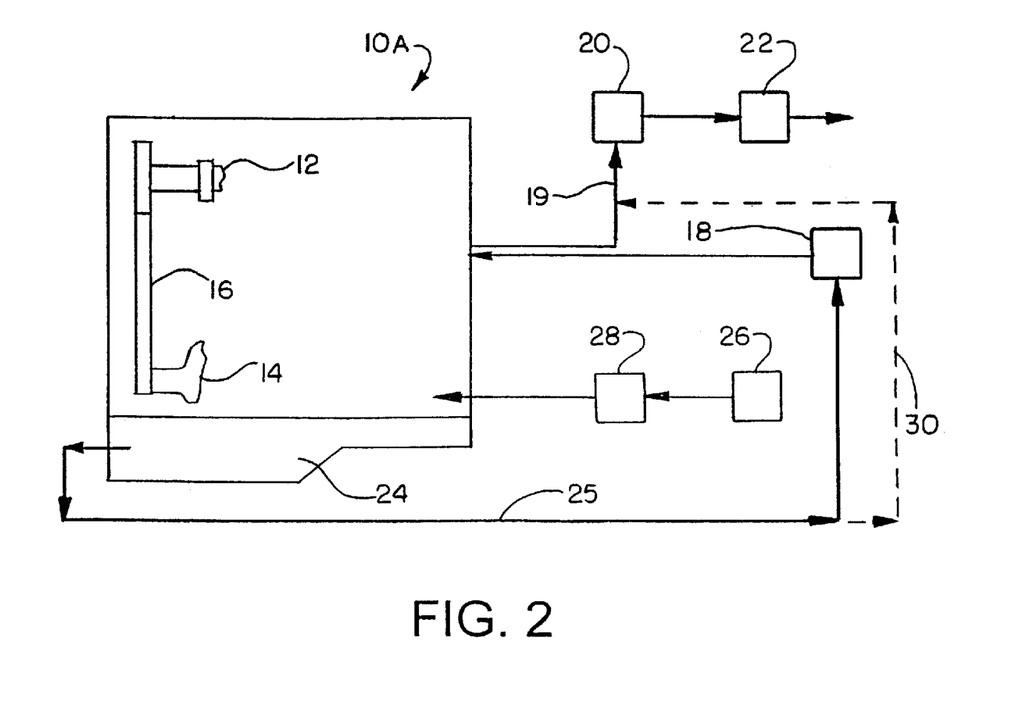
FIG. 2 is a schematic illustration of an internal combustion engine that is useful with another embodiment of the inventive method, said engine being equipped with an exhaust gas aftertreatment device.

In the embodiment illustrated in FIG. 2, the engine 10A is identical to the engine 10 illustrated in FIG. 1 with the exception that the engine 10A is equipped with a make-up oil reservoir 26 and a pump or metering device 28 for pumping new oil from the make-up oil reservoir 26 to the engine 10A. The engine 10A is adapted for using a consumable lubricating oil composition as the low-phosphorus or phosphorus-free lubricating oil composition.

During the operation of engine 10A, a portion of the low-phosphorus or phosphorus-free lubricating oil composition used in the engine is pumped from oil sump 24 to fuel system 18, as indicated by directional arrow 25, where it is combined with the fuel. The introduction of the oil into the fuel may occur in one or more of the fuel tank, fuel return line, fuel injectors, intake manifold, positive crankcase ventilation (PCV) system, exhaust gas recirculation (EGR) system, intake and/or exhaust valve guides, or air intake system of the engine 10A.

The resulting combination of fuel and oil is comprised of about 0.01% to about 5% by weight of said oil, and in one embodiment about 0.05% to about 3% by weight, and in one embodiment about 0.1% to about 1.5% by weight, and in one embodiment about 0.1% to about 1% by weight, and in one embodiment about 0.1% to about 0.7% by weight, and in one embodiment about 0.1% to about 0.5% by weight, and in one embodiment about 0.2% to about 0.3% by weight of said oil, with the remainder being fuel.

Alternatively (as shown in the dashed line 30 in FIG. 2), the portion of the low-phosphorus or phosphorus-free lubricating oil composition removed from the oil sump 24 may be advanced to the exhaust gas system where it is combined with the exhaust gas at any point in the exhaust gas system upstream of (i.e., prior to entry into) the exhaust gas aftertreatment device 20.

The sequence of removing used oil from the engine and replacing it with new oil may be performed continuously or intermittently during the operation of the engine.

Figure 3:
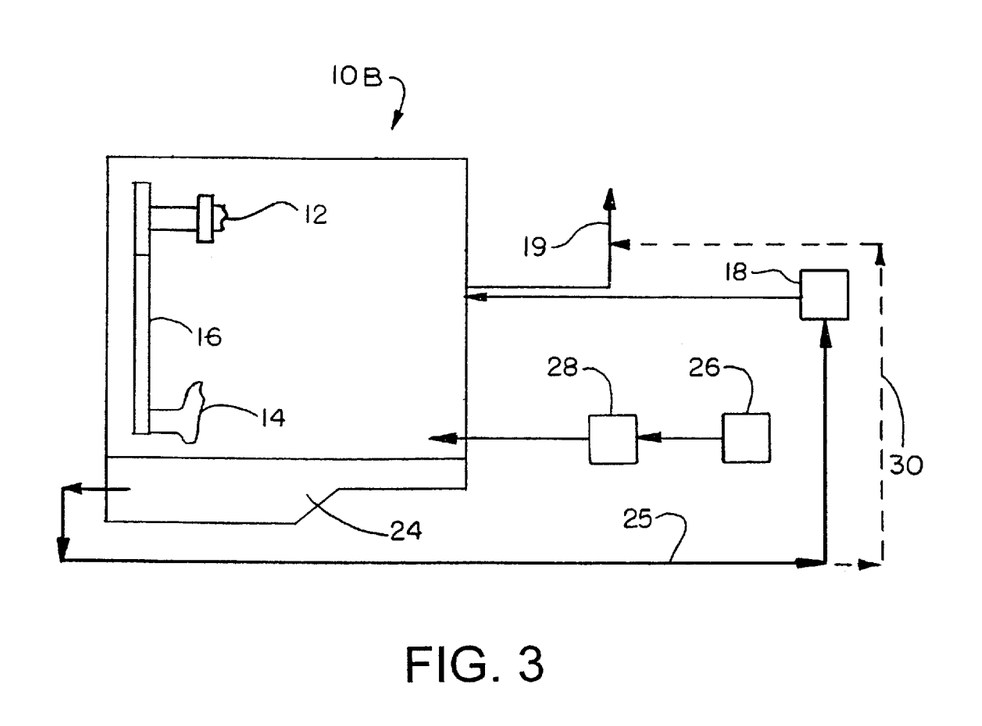
FIG. 3 is a schematic illustration of an internal combustion engine that is useful with another embodiment of the inventive method.

In the embodiment illustrated in FIG. 3, the engine 10B is identical to the engine 10A illustrated in FIG. 2 with the exception that the engine 10B does not have an exhaust gas aftertreatment device 20. The engine 10B may be a compression ignition engine. The engine 10B uses a consumable lubricating oil composition as the low-phosphorus or phosphorus-free lubricating oil composition. The engine 10B is operated in the same manner as the engine 10A with the exception that when the portion of the low-phosphorus or phosphorus-free lubricating oil composition removed from the oil sump 24 is advanced to the exhaust gas system, as indicated in dashed line 30 in FIG. 3, it may be combined with the exhaust gas at any point in the exhaust gas system.

The Normally Liquid or Gaseous Fuel

The normally liquid or gaseous fuel may be a hydrocarbonaceous petroleum distillate fuel such as motor gasoline as defined by ASTM Specification D439 or diesel fuel as defined by ASTM Specification D396. Normally liquid hydrocarbon fuels containing materials such as alcohols, ethers, organo-nitro compounds and the like (e.g., methanol, ethanol, diethyl ether, methyl ethyl ether, nitromethane) are also within the scope of this invention as are liquid fuels derived from vegetable or mineral sources such as corn, alfalfa, shale and coal. Examples of such mixtures include gasoline and ethanol, and diesel fuel and ether.

In one embodiment, the fuel is gasoline, that is, a mixture of hydrocarbons having an ASTM distillation range from about 60° C. at the 10% distillation point to about 205° C. at the 90% distillation point. In one embodiment, the gasoline fuel composition is an unleaded fuel composition. In one embodiment, the gasoline is a chlorine-free or low-chlorine gasoline characterized by a chlorine content of no more than about 10 ppm. In one embodiment, the gasoline is a low-sulfur fuel characterized by a sulfur content of no more than about 300 ppm, and in one embodiment no more than about 150 ppm, and in one embodiment no more than about 100 ppm, and in one embodiment no more than about 50 ppm, and in one embodiment no more than about 25 ppm, and in one embodiment no more than about 10 ppm.

The diesel fuel that is useful may be any diesel fuel. These diesel fuels typically have a 90% point distillation temperature in the range of about 3000C to about 390° C., and in one embodiment about 330° C. to about 350° C. The viscosity for these fuels typically ranges from about 1.3 to about 24 centistokes at 40° C. The diesel fuels can be classified as any of Grade Nos. 1-D, 2-D or 4-D as specified in ASTM D975. These diesel fuels may contain alcohols and esters. In one embodiment the diesel fuel has a sulfur content of up to about 0.05% by weight (low-sulfur diesel fuel) as determined by the test method specified in ASTM D2622-87.

The fuel compositions may contain one or more fuel additives known in the art for enhancing the performance of the fuel. These include deposit preventers or modifiers, dyes, cetane improvers, antioxidants such as 2,6-di-tertiary-butyl-4-methyl-phenol, corrosion inhibitors such as alkylated succinic acids and anhydrides, bacteriostatic agents, gum inhibitors, metal deactivators, demulsifiers, upper cylinder lubricants, anti-icing agents, ashless dispersants, and the like.

The fuel additives may be added directly to the fuel, or they may be diluted with a normally liquid organic diluent such as naphtha, benzene, toluene, or xylene to form an additive concentrate prior to addition to the fuel. These concentrates typically contain from about 10% to about 90% by weight diluent.

The fuel may be a gaseous fuel such as natural gas. The fuel may be stored as a liquid and used in its gaseous form. Examples include propane and dimethyl ether.

The Solid Film Lubricant

The solid film lubricant may be any solid film lubricant that provides enhanced wear resistance characteristics and enhanced lubricity characteristics when applied to wear interfaces or contacts as compared to when the solid film lubricant is not present. The solid film lubricant may have a film thickness of about 5 to about 100 microns, and in one embodiment about 5 to about 75 microns, and in one embodiment about 5 to about 50 microns.

In one embodiment, the solid film lubricant may be an anti-friction coating composition containing solid lubricants such as disclosed in U.S. Pat. No. 5,482,637, which is incorporated herein by reference. Briefly, the solid film lubricants disclosed in this reference are made from a liquid or semi-liquid (e.g. paste) coating composition that is coated on the desired engine parts at low temperatures (e.g., room temperature to about 95° C.) in the form of a thin film. After curing, the thin film provides a low coefficient of friction (e.g., about 0.06 or less), has durability at high temperatures (e.g., about 200° C. to about 400° C.), and has load bearing capabilities. The coating composition is comprised of: (a) a mixture of solid lubricants, at least two of which are selected from graphite, $MoS_2$ and BN, a thermoset resin, and optionally a catalyst for curing the resin; and (b) an evaporative medium for carrying the mixture (a) during the coating process. The weight ratio of the evaporative medium (b) to the mixture (a) may be in the range of about 1:5 to about 2:1.

The solid lubricants may comprise about 30% to about 70% by weight of the solid film lubricant. Graphite may comprise up to about 60% by weight, and in one embodiment about 25% to about 58% by weight of the solid lubricants. $MoS_2$ may comprise up to about 60% by weight, and in one embodiment about 25% to about 58% by weight of the solid lubricants. BN may comprise up to about 20% by weight, and in one embodiment about 7% to about 16% by weight of the solid lubricants.

The solid lubricants may further comprise up to about 20% by weight, and in one embodiment about 5% to about 20% by weight of LiF, $CaF_2$, $WS_2$, a eutectic of $LiF/CaF_2$, a eutectic of $LiF/NaF_2$, or a combination of two or more thereof.

The thermoset resin may be derived from a monomer or oligomer that exhibits a tendency to flow when subjected to stress, and upon curing yields a high molecular weight polymer. The resin may be catalytically cured or thermally cured. The resin may be an epoxy such as bisphenol A, phenol formaldehyde, urea formaldehyde, melamine formaldehyde, alkyd polyester, vinyl butyryl, or a combination of two or more thereof. In one embodiment, the resin is benzoquanamine. The resin may be a polyamide. The resin may be cured using a catalytic curing agent such as 2-propoxyethanol or ancamine. The resin may be crosslinked using a crosslinking agent such as dicyandiamide. The resin may comprise about 20% to about 60% by volume of the mixture (a).

The evaporative medium (b) may be a solvent such as butyl acetate, methyl ethyl ketone, mineral spirits, butyl carbitol, diethylene glycol, cyclo hexanone, diacetone alcohol, aromatic hydrocarbons, mixtures of two or more thereof, and the like. The evaporative medium (b) may be a suspending agent such as water. The water may contain one or more wetting agents or surfactants.

In one embodiment, a solvent-based coating composition is used that is comprised of: graphite at a concentration of about 6% to about 16% by weight based on the weight of the coating composition; $MoS_2$ at a concentration from about 9% to about 19% by weight; BN at a concentration from about 3% to about 5%; an epoxy resin at a concentration of about 26% to about 36% by weight; 2-propoxyethanol at a concentration of about 0.5% by weight; dicyandiamide at a concentration of about 1% to about 3% by weight; diacetone alcohol at a concentration of about 11% to about 21% by weight; and an aromatic hydrocarbon solvent at a concentration of about 3% to about 5% by weight.

In one embodiment, a water suspension is used as the coating composition. This composition may be comprised of: graphite at a concentration of about 2% to about 12% by weight based on the weight of the coating composition; $MoS_2$ at a concentration of about 4% to about 23% by weight; BN at a concentration of about 1% to about 3% by weight; an epoxy resin in an amount from about 18% to about 28% weight; benzoquanamine resin in an amount from about 2% to about 12% by weight; 2-propoxyethanol at a concentration of about 3% to about 13% by weight.; with remainder being water. The water contains about 0.5% to about 1% by weight of a wetting agent, a defoaming agent such as xanthene, and a surfactant.

The coating of the solid film lubricant on the engine part may be carried out by: (i) spraying, roller transferring, or silk screening an acetate, ketone, or mineral spirit solution/emulsion containing the solid lubricants and thermoset resin followed by curing to provide the desired solid film lubricant; (ii) spraying or roller-transferring, or brush painting or imprinting a water-based emulsion containing the solid lubricants and thermoset resin, the emulsion being cured to form the desired solid film lubricant; or (iii) adhering a tape carrying the solid lubricants and thermoset resin, which is subsequently cured. The coating should be controlled to coat thinly, usually to a thickness in the range of up to about 100 microns, and in one embodiment about 5 to about 50 microns, and in one embodiment about 5 to about 20 microns. The solid film lubricant, after curing, may be honed to a coating thickness of about 0.003 inch (76.2 microns) or less, and in one embodiment about 0.001 inch (25.4 microns) or less.

In one embodiment, an intermediate coating layer may be deposited between the foregoing solid film lubricant and the surface of the engine part as disclosed in U.S. Pat. No. 5,482,637. The ingredients for such intermediate layer may be selected from (i) nickel, copper, iron, zinc, tin, manganese, or cobalt; (ii) intermetallic compounds derived from nickel, manganese, chromium, aluminum, vanadium, tungsten, molybdenum, iron, carbon; and (iii) cast iron or steel. This intermediate layer may be comprised of hard particle cores encased in nickel shells, which shells are fused together at their outer regions as a result of plasma thermal spraying of such intermediate coating directly onto the engine part surface. The surface of the engine part may be comprised of a light metal such as aluminum, titanium, or magnesium.

In one embodiment, the surface of the engine part may be provided with grooving (e.g., spiral grooving for interior cylinder surfaces) and the solid film lubricant composition is applied over the grooved surface as disclosed in U.S. Pat. No. 5,482,637.

In one embodiment, the solid film lubricant may be comprised of an anti-friction coating such as disclosed in U.S. Pat. No. 5,358,753, which is incorporated herein by reference. Briefly, the solid film lubricants disclosed in this reference are made from powder grains comprised of cores of solid lubricant particles enclosed within soft metal shells. Upon application to the engine part the soft shells become fused to adjacent shells resulting in the formation of a fused network.

The solid lubricant particles may comprise about 30% to about 70% by weight graphite and about 30% to about 90% by weight $MoS_2$. In one embodiment, other solid lubricant particles selected from one or more of BN, $CaF_2$, LiF, NaF, eutectic mixtures of $LiF/CaF_2$ or $LiF/NaF_2$, and $WS_2$ may be included. When these other solid lubricant particles are present they may be present in an amount of up to about 20% by weight, and in one embodiment about 5% to about 20% by weight of the total solid lubricant particles. The solid lubricant cores may also include hard, wear-resistant particles selected from SiC, FeCrAl, NiCrAl, or FeCrMn and have phases such as intermetallic compounds of FeWNiVCr, NiCrMoVW, FeCrMoWV, CoFeNiCrMoWV, NiCrMoV, and CoMoCrVW. The hard, wear-resistant particles may be present in an amount up to about 25%, and in one embodiment about 5% to about 25% by weight of the solid lubricant particles.

The soft metal shells used in the powder grains may have a thickness of about 4 to about 40 microns. The volume ratio of the shell to the core may be in the range of about 50:50 to about 90:10, and the weight ratio of the shell to the core may be in the range of about 70:30 to about 95:5. The average grain size of the solid lubricant particles in the core may be in the range of about 2 to about 10 microns, and in one embodiment about 2 to about 5 microns, and the hardness of the soft metal shell may be no greater than Rc 40, and in one embodiment Rc 20. In one embodiment the soft metal shells are stable up to a temperature of at least about 650° C.

The solid film lubricants made from these powder grains may be formed by plasma spraying the powder onto a cleansed or freshly exposed engine part surface to form a coating, and finish-smoothing the coating to a desired thickness of, for example, about 25 to about 60 microns.

In one embodiment, the solid film lubricant may be comprised of a composite coating of metal (M) and an oxide ($MO_x$) of the metal that has a lower oxygen content than any of the metal's oxide forms. The metal M may be Ni, Cu, Mo, Fe or an alloy thereof. These coatings are described in International Publication No. WO 97/13884, which is incorporated herein by reference. These coatings may be applied to the engine part using a three-step process. First, the surface of the engine part is cleaned so as to be essentially dirt free, grease free, and oxide free. Next, a supply of metal powder is plasma sprayed onto the surface to produce a composite coating of the metal (M) and an oxide of such metal ($MO_x$) that has the lower amount of oxygen as compared to the metal's oxide forms. Lastly, the exposed surface of the coating is smoothed to induce a hydrodynamic oil film thereon when oil is applied to the pores of the coating during operation of the engine.

In one embodiment, the solid film lubricant may be comprised of a metal oxide coating wherein the metal is Ti, Al, Mo, V or Cr. These are disclosed in German Patent DE 195 48 718 C1, which is incorporated herein by reference.

In one embodiment, the solid film lubricant may be comprised of a carbon coating applied to the engine part under vacuum using an arc created by a laser.

The Low-Phosphorus or Phosphorus-free Lubricating Oil Composition

The low-phosphorus or phosphorus-free lubricating oil composition may be a consumable oil composition or a non-consumable oil composition.

The consumable oil composition, in one embodiment, may be comprised of components that add only C, H, O or N to the lubricating oil composition. In one embodiment, Si may be present. Any other elements that may be present are present as impurities and as such are at relatively low concentrations. The concentration of each of these impurities (prior to use of the oil in the engine) is typically less than about 500 ppm, and in one embodiment less than about 250 ppm, and in one embodiment less than about 100 ppm, and in one embodiment less than about 50 ppm, and in one embodiment less than about 25 ppm, and in one embodiment less than about 10 ppm. This lubricating oil composition is characterized by the absence of EP additives comprised of metal (e.g., zinc) and phosphorus. In one embodiment, this lubricating oil composition is characterized by the absence of detergents or dispersants of the ash-producing type. In one embodiment, this lubricating oil composition is characterized by a sulfur content of no more than about 250 ppm, and in one embodiment no more than about 200 ppm, and in one embodiment about 5 to about 250 ppm, and in one embodiment about 5 to about 200 ppm, and in one embodiment about 5 to about 150 ppm, and in one embodiment about 5 to about 100 ppm, and in one embodiment about 5 to about 50 ppm, and in one embodiment about 5 to about 25 ppm, and in one embodiment about 5 to about 15 ppm, as measured by inductively coupled plasma (ICP) or x-ray techniques. In one embodiment, the low-phosphorus or phosphorus-free lubricating oil composition is sulfur free.

The non-consumable oil composition is the same as the consumable oil composition with the exception that the non-consumable oil may include a minor amount of one or more EP additives comprised of metal (e.g., zinc) and phosphorus, provided that the phosphorus content of the oil composition provided by such EP additives is no more than about 0.08% by weight. The non-consumable oil composition may also contain one or more detergents or dispersants of the ash-producing type provided the total amount of metal-containing ash in the lubricating oil composition does not exceed about 1.5% by weight, and in one embodiment about 1.2% by weight, and in one embodiment about 1.0% by weight, and in one embodiment about 0.8% by weight as determined by the test method in ASTM D874-96.

The low-phosphorus or phosphorus-free lubricating oil composition is a lubricating oil composition that is comprised of one or more base oils which are generally present in a major amount (i.e. an amount greater than about 50% by weight). Generally, the base oil is present in an amount greater than about 60%, or greater than about 70%, or greater than about 80% by weight of the lubricating oil composition.

The low-phosphorus or phosphorus-free lubricating oil composition may have a viscosity of up to about 16.3 cSt at 100° C., and in one embodiment about 5 to about 16.3 cSt at 100° C., and in one embodiment about 6 to about 13 cSt at 100C. In one embodiment, the lubricating oil composition has an SAE Viscosity Grade of 0W, 0W-20, 0W-30, 0W-40, 0W-50, 0W-60, 5W, 5W-20, 5W-30, 5W-40, 5W-50, 5W-60, 10W, 10W-20, 10W-30, 10W-40 OR 10W-50.

The low-phosphorus or phosphorus-free lubricating oil composition may have a high-temperature/high-shear viscosity at 150° C. as measured by the procedure in ASTM D4683 of up to about 4 centipoise, and in one embodiment up to about 3.7 centipoise, and in one embodiment about 2 to about 4 centipoise, and in one embodiment about 2.2 to about 3.7 centipoise, and in one embodiment about 2.7 to about 3.5 centipoise.

The base oil used in the low-phosphorus or phosphorus-free lubricating oil composition may be a natural oil, synthetic oil or mixture thereof. The natural oils that are useful include animal oils and vegetable oils (e.g., castor oil, lard oil) as well as mineral lubricating oils such as liquid petroleum oils and solvent treated or acid-treated mineral lubricating oils of the paraffinic, naphthenic or mixed paraffinic—naphthenic types. Oils derived from coal or shale are also useful. Synthetic lubricating oils include hydrocarbon oils such as polymerized and interpolymerized olefins (e.g., polybutylenes, polypropylenes, propylene isobutylene copolymers, etc.); poly(1-hexenes), poly-(1-octenes), poly(1-decenes), etc. and mixtures thereof; alkylbenzenes (e.g., dodecylbenzenes, tetradecylbenzenes, dinonylbenzenes, di-(2-ethylhexyl)benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymers (e.g., methyl-polyisopropylene glycol ether having an average molecular weight of about 1000, diphenyl ether of polyethylene glycol having a molecular weight of about 500–1000, diethyl ether of polypropylene glycol having a molecular weight of about 1000–1500, etc.) or mono- and polycarboxylic esters thereof, for example, the acetic acid esters, mixed $C_{3-8}$ fatty acid esters, or the $C_{13}$Oxo acid diester of tetraethylene glycol.

Another suitable class of synthetic lubricating oils that can be used comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

The oil can be a poly-alpha-olefin (PAO). Typically, the poly-alpha-olefins are derived from monomers having from about 4 to about 30, or from about 4 to about 20, or from about 6 to about 16 carbon atoms. Examples of useful PAOs include those derived from octene, decene, mixtures thereof, and the like. These PAOs may have a viscosity from about 2 to about 15, or from about 3 to about 12, or from about 4 to about 8 cSt at 100° C. Examples of useful PAOs include 4 cSt at 100° C. poly-alpha-olefins, 6 cSt at 100° C. poly-alpha-olefins, and mixtures thereof. Mixtures of mineral oil with the foregoing poly-alpha-olefins may be used.

Unrefined, refined and refined oils, either natural or synthetic (as well as mixtures of two or more of any of these) of the type disclosed hereinabove can be used in the lubricants of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

In one embodiment, the low-phosphorus or phosphorus-free lubricating oil composition further comprises an acylated nitrogen-containing compound having a substituent of at least about 10 aliphatic carbon atoms. These compounds typically function as ashless dispersants in lubricating oil compositions.

A number of acylated, nitrogen-containing compounds having a substituent of at least about 10 aliphatic carbon atoms and made by reacting a carboxylic acid acylating agent with an amino compound are known to those skilled in the art. In such compositions the acylating agent is linked to the amino compound through an imido, amido, amidine or salt linkage. The substituent of at least about 10 aliphatic carbon atoms may be in either the carboxylic acid acylating agent derived portion of the molecule or in the amino compound derived portion of the molecule. In one embodiment, it is in the acylating agent portion. The acylating agent can vary from formic acid and its acyl derivatives to acylating agents having high molecular weight aliphatic substituents of up to about 5,000, 10,000 or 20,000 carbon atoms. The amino compounds are characterized by the presence within their structure of at least one HN<group.

In one embodiment, the acylating agent is a mono- or polycarboxylic acid (or reactive equivalent thereof such as a substituted succinic or propionic acid and the amino compound is a polyamine or mixture of polyamines, most typically, a mixture of ethylene polyamines. The amine also may be a hydroxyalkyl-substituted polyamine. The aliphatic substituent in such acylating agents typically averages at least about 30 or at least about 50 and up to about 400 carbon atoms.

Illustrative hydrocarbon based groups containing at least 10 carbon atoms are n-decyl, n-dodecyl, tetrapropylene, n-octadecyl, oleyl, chlorooctadecyl, triicontanyl, etc. Generally, the hydrocarbon-based substituents are made from homo- or interpolymers (e.g., copolymers, terpolymers) of mono- and di-olefins having 2 to 10 carbon atoms, such as ethylene, propylene, 1-butene, isobutene, butadiene, isoprene, 1-hexene, 1-octene, etc. Typically, these olefins are 1-monoolefins. The substituent can also be derived from the halogenated (e.g., chlorinated or brominated) analogs of such homo- or interpolymers. The substituent can, however, be made from other sources, such as monomeric high molecular weight alkenes (e.g., 1-tetracontene) and chlorinated analogs and hydrochlorinated analogs thereof, aliphatic petroleum fractions, particularly paraffin waxes and cracked and chlorinated analogs and hydrochlorinated analogs thereof, white oils, synthetic alkenes such as those produced by the Ziegler-Natta process (e.g., poly(ethylene) greases) and other sources known to those skilled in the art. Any unsaturation in the substituent may be reduced or eliminated by hydrogenation according to procedures known in the art.

The hydrocarbon-based substituents are substantially saturated, that is, they contain no more than one carbon-to-carbon unsaturated bond for every ten carbon-to-carbon single bonds present. Usually, they contain no more than one carbon-to-carbon non-aromatic unsaturated bond for every 50 carbon-to-carbon bonds present.

The hydrocarbon-based substituents are also substantially aliphatic in nature, that is, they contain no more than one non-aliphatic moiety (cycloalkyl, cycloalkenyl or aromatic) group of 6 or less carbon atoms for every 10 carbon atoms in the substituent. Usually, however, the substituents contain no more than one such non-aliphatic group for every 50 carbon atoms, and in many cases, they contain no such non-aliphatic groups at all; that is, the typical substituents are purely aliphatic. Typically, these purely aliphatic substituents are alkyl or alkenyl groups.

Specific examples of the substantially saturated hydrocarbon-based substituents containing an average of more than about 30 carbon atoms are the following:

- a mixture of poly(ethylene/propylene) groups of about 35 to about 70 carbon atoms;
- a mixture of the oxidatively or mechanically degraded poly(ethylene/propylene) groups of about 35 to about 70 carbon atoms;
- a mixture of poly(propylene/1-hexene) groups of about 80 to about 150 carbon atoms;
- a mixture of poly(isobutene) groups having an average of about 50 to about 200 carbon atoms.

A useful source of the substituents are poly(isobutene)s obtained by polymerization of a $C_4$ refinery stream having a butene content of about 35 to about 75 weight percent and isobutene content of about 30 to about 60 weight percent in the presence of a Lewis acid catalyst such as aluminum trichloride or boron trifluoride. These polybutenes contain predominantly (greater than 80% of total repeating units) isobutene repeating units of the configuration In one embodiment, the substituent is a polyisobutene group derived from a polyisobutene having a high methylvinylidene isomer content, that is, at least about 70% methylvinylidene, and in one embodiment at least about 80% methylvinylidene. Suitable high methylvinylidene polyisobutenes include those prepared using boron trifluoride catalysts. The preparation of such polyisobutenes in which the methylvinylidene isomer comprises a high percentage of the total olefin composition is described in U.S. Pat. Nos. 4,152,499 and 4,605,808, the disclosures of each of which are incorporated herein by reference.

In one embodiment, the carboxylic acid acylating agent is a hydrocarbon substituted succinic acid or anhydride. The substituted succinic acid or anhydride consists of hydrocarbon-based substituent groups and succinic groups wherein the substituent groups are derived from a polyalkene, said acid or anhydride being characterized by the presence within its structure of an average of at least about 0.9 succinic group for each equivalent weight of substituent groups, and in one embodiment about 0.9 to about 2.5 succinic groups for each equivalent weight of substituent groups. The polyalkene generally has a number average molecular weight ($\overline{M}n$) of at least about 700, and in one embodiment about 700 to about 2000, and in one embodiment about 900 to about 1800. The ratio between the weight average molecular weight ($\overline{M}w$) and the ($\overline{M}n$) (that is, the $\overline{M}w/\overline{M}n$) can range from about 1 to about 10, or about 1.5 to about 5. In one embodiment the polyalkene has an $\overline{M}w/\overline{M}n$ value of about 2.5 to about 5. For purposes of this invention, the number of equivalent weights of substituent groups is deemed to be the number corresponding to the quotient obtained by dividing the $\overline{M}n$ value of the polyalkene from which the substituent is derived into the total weight of the substituent groups present in the substituted succinic acid. Thus, if a substituted succinic acid is characterized by a total weight of substituent group of 40,000 and the $\overline{M}n$ value for the polyalkene from which the substituent groups are derived is 2000, then that substituted succinic acylating agent is characterized by a total of 20 (40,000/2000=20) equivalent weights of substituent groups.

In one embodiment the carboxylic acid acylating agent is a substituted succinic acid or anhydride, said substituted succinic acid or anhydride consisting of hydrocarbon-based substituent groups and succinic groups wherein the substituent groups are derived from polybutene in which at least about 50% of the total units derived from butenes is derived from isobutylene. The polybutene is characterized by an $\overline{M}n$ value of about 1500 to about 2000 and an $\overline{M}w/\overline{M}n$ value of about 3 to about 4. These acids or anhydrides are characterized by the presence within their structure of an average of about 1.5 to about 2.5 succinic groups for each equivalent weight of substituent groups.

In one embodiment the carboxylic acid is at least one substituted succinic acid or anhydride, said substituted succinic acid or anhydride consisting of substituent groups and succinic groups wherein the substituent groups are derived from polybutene in which at least about 50% of the total units derived from butenes is derived from isobutylene. The polybutene has an $\overline{M}n$ value of about 800 to about 1200 and an $\overline{M}w/\overline{M}n$ value of about 2 to about 3. The acids or anhydrides are characterized by the presence within their structure of an average of about 0.9 to about 1.2 succinic groups for each equivalent weight of substituent groups.

The amino compound is characterized by the presence within its structure of at least one HN<group and can be a monoamine or polyamine. Mixtures of two or more amino compounds can be used in the reaction with one or more acylating reagents. In one embodiment, the amino compound contains at least one primary amino group (i.e., —NH$_2$) and more preferably the amine is a polyamine, especially a polyamine containing at least two —NH— groups, either or both of which are primary or secondary amines. The amines may be aliphatic, cycloaliphatic, aromatic or heterocyclic amines.

Among the useful amines are the alkylene polyamines, including the polyalkylene polyamines. The alkylene polyamines include those conforming to the formula wherein n is from 1 to about 10; each R is independently a hydrogen atom, a hydrocarbyl group or a hydroxy-substituted or amine-substituted hydrocarbyl group having up to about 30 atoms, or two R groups on different nitrogen atoms can be joined together to form a U group, with the proviso that at least one R group is a hydrogen atom and U is an alkylene group of about 2 to about 10 carbon atoms. U may be ethylene or propylene. Alkylene polyamines where each R is hydrogen or an amino-substituted hydrocarbyl group with the ethylene polyamines and mixtures of ethylene polyamines are useful. Usually n will have an average value of from about 2 to about 7. Such alkylene polyamines include methylene polyamine, ethylene polyamines, propylene polyamines, butylene polyamines, pentylene polyamines, hexylene polyamines, heptylene polyamines, etc. The higher homologs of such amines and related amino alkyl-substituted piperazines are also included.

Alkylene polyamines that are useful include ethylene diamine, triethylene tetramine, propylene diamine, trimethylene diamine, hexamethylene diamine, decamethylene diamine, octamethylene diamine, di(heptamethylene) triamine, tripropylene tetramine, tetraethylene pentamine, trimethylene diamine, pentaethylene hexamine, di(trimethylene)triamine, N-(2-aminoethyl)piperazine, 1,4-bis(2-aminoethyl)piperazine, and the like. Higher homologs as are obtained by condensing two or more of the above-illustrated alkylene amines are useful, as are mixtures of two or more of any of the afore-described polyamines.

Ethylene polyamines, such as those mentioned above, are especially useful for reasons of cost and effectiveness. Such polyamines are described in detail under the heading "Diamines and Higher amines" in The Encyclopedia of Chemical Technology, Second Edition, Kirk and Othmer, Volume 7, pages 27–39, Interscience Publishers, Division of John Wiley and Sons, 1965, which is hereby incorporated by reference for the disclosure of useful polyamines. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines.

Other useful types of polyamine mixtures are those resulting from stripping of the above-described polyamine mixtures. In this instance, lower molecular weight polyamines and volatile contaminants are removed from an alkylene polyamine mixture to leave as residue what is often termed "polyamine bottoms". In general, alkylene polyamine bottoms can be characterized as having less than about 2% by weight, usually less than about 1% by weight material boiling below about 200° C. In the instance of ethylene polyamine bottoms, which are readily available and found to be quite useful, the bottoms contain less than about 2% by weight total diethylene triamine (DETA) or triethylene tetramine (TETA). A typical sample of such ethylene polyamine bottoms obtained from the Dow Chemical Company of Freeport, Tex. designated "E-100" showed a specific gravity at 15.6° C. of 1.0168, a percent nitrogen by weight of 33.15 and a viscosity at 40° C. of 121 centistokes. Gas chromatography analysis of such a sample indicates it contains about 0.93% "Light Ends" (most probably DETA), 0.72% TETA, 21.74% tetraethylene pentamine and 76.61% pentaethylene hexamine and higher (by weight). These alkylene polyamine bottoms include cyclic condensation products such as piperazine and higher analogs of diethylenetriamine, triethylenetetramine and the like.

These alkylene polyamine bottoms can be reacted solely with the acylating agent, in which case the amino reactant consists essentially of alkylene polyamine bottoms, or they can be used with other amines and polyamines, or alcohols or mixtures thereof. In these latter cases at least one amino reactant comprises alkylene polyamine bottoms.

Other polyamines are described in, for example, U.S. Pat. Nos. 3,219,666 and 4,234,435, and these patents are hereby incorporated by reference for their disclosures of amines which can be reacted with the acylating agents described above to form useful acylated nitrogen-containing compounds.

In one embodiment, the amine may be a hydroxyamine. Typically, the hydroxyamines are primary, secondary or tertiary alkanol amines or mixtures thereof. Such amines can be represented by the formulae:

wherein each R is independently a hydrocarbyl group of one to about eight carbon atoms or hydroxyhydrocarbyl group of two to about eight carbon atoms, preferably one to about four, and R' is a divalent hydrocarbyl group of about two to about 18 carbon atoms, preferably two to about four. The group —R'—OH in such formulae represents the hydroxyhydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R' is independently a methyl, ethyl, propyl, butyl, pentyl or hexyl group.

Examples of these alkanolamines include mono-, di-, and triethanol amine, diethylethanolamine, ethylethanolamine, butyldiethanolamine, etc.

The hydroxyamines can also be an ether N-(hydroxyhydrocarbyl)-amine. These are hydroxypoly (hydrocarbyloxy) analogs of the above-described hydroxy amines (these analogs also include hydroxyl-substituted oxyalkylene analogs). Such N-(hydroxyhydrocarbyl) amines can be conveniently prepared by reaction of epoxides with afore-described amines and can be represented by the formulae:

wherein x is a number from about 2 to about 15 and R and R' are as described above. R may also be a hydroxypoly (hydrocarbyloxy) group.

The acylated nitrogen-containing compounds include amine salts, amides, imides, amidines, amidic acids, amidic salts and imidazolines as well as mixtures thereof. To prepare the acylated nitrogen-containing compounds from the acylating reagents and the amino compounds, one or more acylating reagents and one or more amino compounds are heated, optionally in the presence of a normally liquid, substantially inert organic liquid solvent/diluent, at temperatures in the range of about 80° C. up to the decomposition point of either the reactants or the carboxylic derivative but normally at temperatures in the range of about 100° C. up to about 300° C. provided 300° C. does not exceed the decomposition point. Temperatures of about 125° C. to about 250° C. are normally used. The acylating reagent and the amino compound are reacted in amounts sufficient to provide from about one-half equivalent up to about 2 moles of amino compound per equivalent of acylating reagent.

Many patents have described useful acylated nitrogen-containing compounds including U.S. Pat. Nos. 3,172,892; 3,219,666; 3,272,746; 3,310,492; 3,341,542; 3,444,170; 3,455,831; 3,455,832; 3,576,743; 3,630,904; 3,632,511; 3,804,763; and 4,234,435. A typical acylated nitrogen-containing compound of this class is that made by reacting a poly(isobutene)-substituted succinic acid acylating agent (e.g., anhydride, acid, ester, etc.) wherein the poly (isobutene) substituent has between about 50 to about 400 carbon atoms with a mixture of ethylenepolyamines having about 3 to about 7 amino nitrogen atoms per ethylenepolyamine and about 1 to about 6 ethylene units. The above-noted U.S. patents are hereby incorporated by reference for their disclosure of acylated amino compounds and their method of preparation.

Another type of acylated nitrogen-containing compound belonging to this class is that made by reacting a carboxylic acid acylating agent with a polyamine, wherein the polyamine is the product made by condensing a hydroxy material with an amine. These compounds are described in U.S. Pat. No. 5,053,152 which is incorporated herein by reference for its disclosure of such compounds.

Another type of acylated nitrogen-containing compound belonging to this class is that made by reacting the afore-described alkyleneamines with the afore-described substituted succinic acids or anhydrides and aliphatic monocarboxylic acids having from 2 to about 22 carbon atoms. In these types of acylated nitrogen compounds, the mole ratio of succinic acid to monocarboxylic acid ranges from about 1:0.1 to about 1:1. Typical of the monocarboxylic acid are formic acid, acetic acid, dodecanoic acid, butanoic acid, oleic acid, stearic acid, the commercial mixture of stearic acid isomers known as isostearic acid, tall oil acid, etc. Such materials are more fully described in U.S. Pat. Nos. 3,216,936 and 3,250,715 which are hereby incorporated by reference for their disclosures in this regard.

Still another type of acylated nitrogen-containing compound that may be useful is the product of the reaction of a fatty monocarboxylic acid of about 12–30 carbon atoms and the afore-described alkyleneamines, typically, ethylene-, propylene- ortrimethylenepolyamines containing 2 to 8 amino groups and mixtures thereof. The fatty monocarboxylic acids are generally mixtures of straight and branched chain fatty carboxylic acids containing 12–30 carbon atoms. A widely used type of acylated nitrogen compound is made by reacting the afore-described alkylenepolyamines with a mixture of fatty acids having from 5 to about 30 mole percent straight chain acid and about 70 to about 95% mole branched chain fatty acids. Among the commercially available mixtures are those known widely in the trade as isostearic acid. These mixtures are produced as a by-product from the dimerization of unsaturated fatty acids as described in U.S. Pat. Nos. 2,812,342 and 3,260,671.

The branched chain fatty acids can also include those in which the branch is not alkyl in nature, such as found in phenyl and cyclohexyl stearic acid and the chloro-stearic acids. Branched chain fatty carboxylic acid/alkylene polyamine products have been described extensively in the art. See for example, U.S. Pat. Nos. 3,110,673; 3,251,853; 3,326,801; 3,337,459; 3,405,064; 3,429,674; 3,468,639; 3,857,791. These patents are hereby incorporated by reference for their disclosure of fatty acid/polyamine condensates for use in lubricating oil formulations.

In one embodiment, the low-phosphorus or phosphorus-free lubricating oil composition is characterized by a chlorine level of no more than about 10 ppm, and in one embodiment no more than about 7 ppm, and in one embodiment no more than about 5 ppm. This necessitates that the acylated nitrogen-containing compound be chlorine-free or contain such low chlorine levels that the addition of such compound to the lubricating oil composition results in the formation of a lubricating oil composition with the above-indicated chlorine level. In one embodiment, the acylated nitrogen-containing compound has a chlorine content of no more than about 50 ppm, and in one embodiment no more than about 25 ppm, and in one embodiment no more than about 10 ppm. In one embodiment, the acylated nitrogen-containing compound is chlorine free.

The acylated nitrogen-containing compound is typically employed in the low-phosphorus or phosphorus-free lubricating oil composition at a concentration in the range of about 1 to about 25% percent by weight, and in one embodiment about 5% to about 15% by weight. These compounds can be added directly to the lubricating oil composition. In one embodiment, however, they are diluted with a substantially inert, normally liquid organic diluent such as mineral oil, naphtha, benzene, toluene or xylene to form an additive concentrate. These concentrates usually contain from about 1% to about 99% by weight, and in one embodiment about 10% to about 90% by weight of the diluent.

As indicated above, when the low-phosphorus or phosphorus-free lubricating oil composition is a non-consumable oil, optionally it may contain a minor amount of one or more EP additives comprised of a metal and phosphorus, provided that the amount of phosphorus contributed to the low-phosphorus or phosphorus-free lubricating oil composition by this additive does not exceed about 0.08% by weight of the low-phosphorus or phosphorus-free lubricating oil composition. In one embodiment, the phosphorus content does not exceed about 0.07% by weight, and in one embodiment about 0.06% by weight, and in one embodiment about 0.05% by weight, and in one embodiment about 0.04% by weight, and in one embodiment about 0.035% by weight, and in one embodiment about 0.03% by weight, and in one embodiment about 0.025% by weight, and in one embodiment about 0.02% by weight, and in one embodiment about 0.015% by weight, and in one embodiment the phosphorus content does not exceed about 0.01% by weight. The phosphorus-containing acids useful in making these EP additives may be represented by the formula (A)

wherein in Formula (A): $X^1$, $X^2$, $X^3$ and $X^4$ are independently oxygen or sulfur, a and b are independently zero or one, $R^1$, $R^2$ and $R^3$ are independently hydrocarbyl groups, and $R^3$ can be hydrogen. Illustrative examples include: dihydrocarbyl phosphinodithioic acids, S-hydrocarbyl hydrocarbyl phosphonotrithioic acids, O-hydrocarbyl hydrocarbyl phosphinodithioic acids, S,S-dihydrocarbyl phosphorotetrathioic acids, O,S-dihydrocarbyl phosphorotrithioic acids, O,O-dihydrocarbyl phosphorodithioic acids, and the like.

Useful phosphorus-containing acids are phosphorus- and sulfur-containing acids. These include those acids wherein in Formula (A) at least one $X^3$ or $X^4$ is sulfur, and in one embodiment both $X^3$ and $X^4$ are sulfur, at least one $X^1$ or $X^2$ is oxygen or sulfur, and in one embodiment both $X^1$ and $X^2$ are oxygen, and a and b are each 1. Mixtures of these acids may be employed in accordance with this invention.

$R^1$ and $R^2$ in Formula (A) are independently hydrocarbyl groups that are preferably free from acetylenic unsaturation and usually also from ethylenic unsaturation and in one embodiment have from about 1 to about 50 carbon atoms, and in one embodiment from about 1 to about 30 carbon atoms, and in one embodiment from about 3 to about 18 carbon atoms, and in one embodiment from about 3 to about 8 carbon atoms. Each $R^1$ and $R^2$ can be the same as the other, although they may be different and either or both may be mixtures. Examples of $R^1$ and $R^2$ groups include isopropyl, n-butyl, isobutyl, amyl, 4-methyl-2-pentyl, isooctyl, decyl, dodecyl, tetradecyl, 2-pentenyl, dodecenyl, phenyl, naphthyl, alkylphenyl, alkylnaphthyl, phenylalkyl, naphthylalkyl, alkylphenylalkyl, alkylnaphthylalkyl, and mixtures thereof. Particular examples of useful mixtures include, for example, isopropyl/n-butyl; isopropyl/secondary butyl; isopropyl/4-methyl-2-pentyl; isopropyl/2-ethyl-1-hexyl; isopropyl/isooctyl; isopropyl/decyl; isopropyl/dodecyl; and isopropyl/tridecyl.

$R^3$ in Formula (A) can be hydrogen or a hydrocarbyl group (e.g., alkyl) of 1 to about 12 carbon atoms, and in one embodiment 1 to about 4 carbon atoms.

The preparation of the metal salts of the phosphorus-containing acids may be effected by reaction with the metal or metal oxide. Simply mixing and heating these two reactants is sufficient to cause the reaction to take place and the resulting product is sufficiently pure for the purposes of this invention. Typically the formation of the salt is carried out in the presence of a diluent such as an alcohol, water or diluent oil. Neutral salts are prepared by reacting one equivalent of metal oxide or hydroxide with one equivalent of the acid. Basic metal salts are prepared by adding an excess of (more than one equivalent) the metal oxide or hydroxide to one equivalent of phosphorodithioic acid.

The metal salts of the phosphorus-containing acids represented by Formula (A) which are useful include those salts containing Group IA, IIA or IIB metals, aluminum, lead, tin, iron, molybdenum, manganese, cobalt, nickel or bismuth. Zinc is a useful metal. These salts can be neutral salts or basic salts. Examples of useful metal salts of phosphorus-containing acids, and methods for preparing such salts are found in the prior art such as U.S. Pat. Nos. 4,263,150, 4,289,635; 4,308,154; 4,322,479; 4,417,990; and 4,466,895, and the disclosures of these patents are hereby incorporated by reference. These salts include the Group II metal phosphorodithioates such as zinc dicyclohexylphosphorodithioate, zinc dioctylphosphorodithioate, barium di(heptylphenyl)-phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

In one embodiment, the low-phosphorus or phosphorus-free lubricating oil composition is characterized by the absence of the foregoing EP additives.

An advantage of using the foregoing low-phosphorus or phosphorus-free lubricating oil compositions is that these oil compositions may be easier to dispose of from an environmental perspective than conventional lubricating oils. This is due to the low level or absence of EP additives containing phosphorus and metal in these lubricating oil compositions. Conventional lubricating oil compositions, on the other hand, typically contain relatively high concentrations of such EP additives.

The low-phosphorus or phosphorus-free lubricating oil composition may contain, in addition to the acylated nitrogen-containing compounds referred to above, one or more detergents or dispersants of the ashless type. The ashless detergents and dispersants are so called despite the fact that, depending on their constitution, they may upon combustion yield a non-volatile material such as boric oxide or phosphorus pentoxide; however, they do not ordinarily contain metal and therefore do not yield a metal-containing ash on combustion. Many types are known in the art, and are suitable for use in these lubricating oil compositions. These include the following:

(1) Reaction products of carboxylic acids (or derivatives thereof) containing at least about 34, and in one embodiment at least about 54 carbon atoms, with organic hydroxy compounds such as phenols and alcohols, and/or basic inorganic materials. Examples of these "carboxylic dispersants" are described in many U.S. Pat. Nos. including 3,219,666; 4,234,435; and 4,938,881.

(2) Reaction products of relatively high molecular weight aliphatic or alicyclic halides with amines, preferably oxyalkylene polyamines. These may be characterized as "amine dispersants" and examples thereof are described for example, in the following U.S. Pat. Nos.: 3,275,554; 3,438,757; 3,454,555; and 3,565,804.

(3) Reaction products of alkyl phenols in which the alkyl group contains at least about 30 carbon atoms with aldehydes (especially formaldehyde) and amines (especially polyalkylene polyamines), which may be characterized as "Mannich dispersants." The materials described in the following U.S. Pat. Nos. are illustrative: 3,649,229; 3,697,574; 3,725,277; 3,725,480; 3,726,882; and 3,980,569.

(4) Products obtained by post-treating the amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. Pat. Nos.: 3,639,242; 3,649,229; 3,649,659; 3,658,836; 3,697,574; 3,702,757; 3,703,536; 3,704,308; and 3,708,422.

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. Pat. Nos.: 3,329,658; 3,449,250; 3,519,565; 3,666,730; 3,687,849; and 3,702,300.

The above-noted patents are incorporated by reference herein for their disclosures of ashless dispersants.

When the low-phosphorus or phosphorus-free lubricating oil composition is used as a non-consumable oil it may contain one or more detergents or dispersants of the ash-producing type. Thus, in this embodiment, the low-phosphorus or phosphorus-free lubricating oil composition is a low-ash lubricating oil composition. The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium. The concentration of ash-producing detergent or dispersant in the low-ash lubricating oil composition may be in the range that is sufficient to provide an ash content of up to about 2% by weight as measured by the test procedure in ASTM D874-96, and in one embodiment up to about 1.5% by weight, and in one embodiment up to about 1% by weight, and in one embodiment up to about 0.6% by weight.

The low-phosphorus or phosphorus-free lubricating oil composition may also contain other lubricant additives known in the art. These include, for example, corrosion-inhibiting agents, antioxidants, viscosity modifiers, pour point depressants, friction modifiers, fluidity modifiers, anti-foam agents, etc.

Pour point depressants are used to improve the low temperature properties of oil-based compositions. See, for example, page 8 of "Lubricant Additives" by C. V. Smalheer and R. Kennedy Smith (Lezius Hiles Co. publishers, Cleveland, Ohio, 1967). Examples of useful pour point depressants are polymethacrylates; polyacrylates; polyacrylamides; condensation products of haloparaffin waxes and aromatic compounds; vinyl carboxylate polymers; and terpolymers of dialkylfumarates, vinyl esters of fatty acids and alkyl vinyl ethers. Pour point depressants are described in U.S. Pat. Nos. 2,387,501; 2,015,748; 2,655,479; 1,815,022; 2,191,498; 2,666,746; 2,721,877; 2,721,878; and 3,250,715 which are herein incorporated by reference for their relevant disclosures.

Anti-foam agents are used to reduce or prevent the formation of stable foam. Typical anti-foam agents include silicones or organic polymers. Additional antifoam compositions are described in "Foam Control Agents," by Henry T. Kerner (Noyes Data Corporation, 1976), pages 125–162.

Each of the foregoing additives, when used, is used at a functionally effective amount to impart the desired properties to the lubricant. Thus, for example, if an additive is a corrosion inhibitor, a functionally effective amount of this corrosion inhibitor would be an amount sufficient to impart the desired corrosion inhibition characteristics to the lubricant. Generally, the concentration of each of these additives, when used, ranges from about 0.001% to about 20% by weight, and in one embodiment about 0.01% to about 10% by weight based on the total weight of the low-phosphorus or phosphorus-free lubricating oil composition.

These additives can be added directly to the low-phosphorus or phosphorus-free lubricating oil composition. In one embodiment, however, they are diluted with a substantially inert, normally liquid organic diluent such as mineral oil, naphtha, benzene, toluene or xylene to form an additive concentrate. These concentrates usually contain from about 1% to about 99% by weight, and in one embodiment about 10% to about 90% by weight of such diluent.

Examples 1 and 2

Examples of low-phosphorus or phosphorus-free lubricating oil compositions that may be used are disclosed below (in the table below all numerical values provided for the components of the composition (except the foam inhibitor) are in percent by weight).

|  | 1 | 2 |
|---|---|---|
| Base oil - SAE 5W-30 Polyalpha olefin oil mixture (80% by wt. polyalphaolefin having viscosity of 6 cSt @ 100° C. and 20% by wt. polyalphaolefin having viscosity of 4 cSt 100° C.) | 83.4 | — |
| Base oil - SAE 5W-20 100 N mineral oil having a viscosity of 21.50 cSt at 40° C. and 4.41 cSt at 100° C., a sulfur content of 0.0010% by weight, a nitrogen content of 0.0002% by weight, and a hydrocarbon content that is 100% saturates. | — | 81.7 |
| Dispersant - Succinimide derived from high vinylidene polyisobutene (number average molecular weight (Mn) equal to about 1000) substituted succinic anhydride and tetraethylene pentamine (Nitrogen content = 3.3% by wt.) dispersed in oil (40% by wt. diluent oil) | 14.3 | — |
| Dispersant - Succinimide derived from polyisobutene (Mn equal to about 1000) substituted succinic anhydride and polyethylene amines (Nitrogen content = 0.97% by wt.; chlorine content = 0% by wt.) dispersed in oil (40% by wt. diluent oil) | — | 16.67 |
| Viscosity modifier - LZ 7067 (a product of Lubrizol identified as an olefin copolymer) | 0.8 | — |
| Viscosity modifier - Styrene-maleic anhydride copolymer dispersed in oil (53.6% by wt. diluent oil) | — | 0.3 |
| Diluent oil (100 N mineral oil) | 0.38 | 0.13 |
| Corrosion inhibitor - Pluradyne FL11 (product of BASF identified as an ethylene oxide-propylene oxide copolymer) | 0.02 | 0.02 |
| Antioxidant - Nonylated diphenylamine | 0.6 | 0.6 |
| Antioxidant - 4,4'-methylene bis 2,6-di-t-butyl phenol | 0.5 | 0.5 |
| Foam inhibitor - Polydimethyl siloxane dispersed in kerosene (90% kerosene) | 50 ppm | — |
| Physical properties: | | |
| Viscosity @ 100° C., cSt | 11.59 | 6.90 |
| Viscosity @ 40° C., cSt | 70.71 | 38.66 |
| Viscosity index | 159 | 139 |
| High Temperature/High Sheer @ 150° C., cP (ASTM D 4683) | 3.46 | 2.37 |
| Chemical properties: | | |
| % S, P, Zn, Si, Ca, Mg, Na, Halogen | nil | nil |
| % N, wt % | 0.492 | 0.181 |
| % Si, ppm | 2 | — |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of operating an internal combustion engine comprising a valve train, said method comprising:
   (A) operating said engine using a normally liquid or gaseous fuel;
   (B) lubricating components of said valve train using a solid film lubricant; and
   (C) lubricating said engine, including said components of said valve train, using a low-phosphorus or phosphorous lubricating oil composition, said low-phosphorus or phosphorus-free lubricating oil composition optionally containing an extreme-pressure additive comprised of metal and phosphorus, provided the amount of phosphorus contributed to said low-phosphorus or phosphorus-free lubricating oil composition by said extreme-pressure additive does not exceed about 0.08% by weight based on the weight of said low-phosphorus or phosphorus-free lubricating oil composition.

2. The method of claim 1 wherein said method further comprises the following additional steps:

(D) removing part of said low-phosphorus or phosphorus-free lubricating oil composition from said engine, said removed part of said low-phosphorus or phosphorus-free lubricating oil composition (i) being combined with said fuel and consumed with said fuel as said engine is operated or (ii) being combined with the exhaust gas from said engine and removed from said engine with said exhaust gas; and (E) adding an additional amount of said low-phosphorus or phosphorus-free lubricating oil composition to said engine to replace said removed part of said low-phosphorus or phosphorus-free lubricating oil composition.

3. The method of claim 2 wherein the combination of said fuel composition and said low-phosphorus or phosphorus-free lubricating oil composition formed in step (D) is comprised of about 0.01% to about 5% by weight of said low-phosphorus or phosphorus-free lubricating oil composition.

4. The method of claim 2 wherein during step (D) said removed part of said low-phosphorus or phosphorus-free lubricating oil composition is introduced into said fuel composition in the fuel tank, fuel return line, fuel injectors, intake manifold, positive crankcase ventilation system, exhaust gas recirculation system, or air intake system of the engine.

5. The method of claim 1 wherein said engine is a compression ignition engine.

6. The method of claim 1 wherein said engine is a compression ignition engine equipped with an exhaust gas aftertreatment device.

7. The method of claim 1 wherein said fuel is a diesel fuel composition.

8. The method of claim 1 wherein said fuel composition is a low-sulfur diesel fuel composition.

9. The method of claim 1 wherein said engine is a spark ignition engine equipped with an exhaust gas aftertreatment device.

10. The method of claim 1 wherein said fuel is a gasoline fuel composition.

11. The method of claim 1 wherein said fuel is an unleaded gasoline fuel composition.

12. The method of claim 1 wherein said fuel is a gasoline fuel composition having a sulfur content of up to about 300 ppm.

13. The method of claim 1 wherein said fuel is a gasoline fuel composition having a chlorine content of no more than about 10 ppm.

14. The method of claim 1 wherein the components of said valve train that are lubricated using said solid film lubricant include wear interfaces or contacts of one or more cam lobes, tappets, followers, valve tips, rocker arms, or rocker arm mechanisms.

15. The method of claim 1 wherein one or more wear interfaces or contacts of the cylinder bores or cylinder walls of said engine are lubricated using said solid film lubricant.

16. The method of claim 1 wherein one or more wear interfaces or contacts of the piston rings of said engine are lubricated using said solid film lubricant.

17. The method of claim 1 wherein one or more the wear interfaces or contacts of the skirts of said engine are lubricated using said solid film lubricant.

18. The method of claim 1 wherein one or more wear interfaces or contacts of the bearings of said engine are lubricated using said solid film lubricant.

19. The method of claim 1 wherein said solid film lubricant is comprised of at least two materials selected from graphite, $MoS_2$ and BN.

20. The method of claim 1 wherein said solid film lubricant is comprised of graphite and $MoS_2$.

21. The method of claim 1 wherein said solid film lubricant is comprised of a composite coating of a metal and an oxide of said metal wherein said oxide has a lower oxygen content than any of said metal's oxide forms, said metal being selected from Ni, Cu, Mo, Fe or an alloy thereof.

22. The method of claim 1 wherein said solid film lubricant is comprised of a metal oxide coating, said metal being selected from Ti, Al, Mo, V or Cr.

23. The method of claim 1 wherein said solid film lubricant is comprised of a carbon coating that has been applied under vacuum using an arc created by a laser.

24. The method of claim 1 wherein said low-phosphorus or phosphorus-free lubricating oil composition is comprised of components that add only C, H, O or N, and optionally Si to said composition.

25. The method of claim 1 wherein said low-phosphorus or phosphorus-free lubricating oil composition has a viscosity of up to about 16.3 cSt at 100° C.

26. The method of claim 1 wherein said low-phosphorus or phosphorus-free lubricating oil composition has an SAE Viscosity Grade of 0W, 0W-20, 0W-30, 0W-40, 0W-50, 0W-60, 5W, 5W-20, 5W-30, 5W-40, 5W-50, 5W-60, 10W, 10W-20, 10W-30, 10W-40 or 10W-50.

27. The composition of claim 1 wherein said low-phosphorus or phosphorus-free lubricating oil composition has a high-temperature/high-shear viscosity at 150° C. of up to about 4 centipoise.

28. The method of claim 1 wherein said low-phosphorus or phosphorus-free lubricating oil composition is comprised of a mineral base oil.

29. The method of claim 1 wherein said low-phosphorus or phosphorus-free lubricating oil composition is comprised of a poly-alpha-olefin base oil.

30. The method of claim 1 wherein said low-phosphorus or phosphorus-free lubricating oil composition is comprised of an acylated nitrogen-containing compound having a substituent of at least about 10 aliphatic carbon atoms.

31. The method of claim 30 wherein said acylated nitrogen-containing compound is derived from a carboxylic acylating agent and at least one amino compound containing at least one —NH— group, said acylating agent being linked to said amino compound through an imido, amido, amidine or salt linkage.

32. The method of claim 31 wherein said amino compound is an alkylenepolyamine represented by the formula:

wherein U is an alkylene group of from about 2 to about 10 carbon atoms; each R is independently a hydrogen atom, a hydrocarbyl group, a hydroxy-substituted hydrocarbyl group, or an amine-substituted hydrocarbyl group containing up to about 30 carbon atoms, with the proviso that at least one R is a hydrogen atom; and n is 1 to about 10.

33. The method of claim 31 wherein said carboxylic acylating agent is a mono- or polycarboxylic acid or anhydride containing an aliphatic hydrocarbyl substituent of at least about 30 carbon atoms.

34. The method of claim 30 wherein said acylated nitrogen-containing compound is a polyisobutene substituted succinimide containing at least about 50 aliphatic carbon atoms in the polyisobutene group.

35. The method of claim 30 wherein said acylated nitrogen-containing compound has a chlorine content of no more than about 50 ppm.

36. The method of claim 1 wherein said extreme-pressure additive is present and is a compound represented by the formula (A)

wherein in Formula (A), $X^1$, $X^2$ and $X^3$ and $X^4$ are independently O or S, a and b are independently zero or 1, and $R^1$, $R^2$ and $R^3$ are independently hydrocarbyl groups and $R^3$ can be hydrogen.

37. The method of claim 1 wherein said low-phosphorus or phosphorus-free lubricating oil composition is characterized by the absence of an extreme-pressure additive comprised of metal and phosphorus.

38. The method of claim 1 wherein said low-phosphorus or phosphorus-free lubricating oil composition further comprises an ash-producing detergent or dispersant.

39. The method of claim 1 wherein said low-phosphorus or phosphorus-free lubricating oil composition is characterized by the absence of an ash-producing detergent or dispersant.

40. The method of claim 1 wherein said low-phosphorus or phosphorus-free lubricating oil composition is comprised of at least one ashless detergent or dispersant, corrosion-inhibiting agent, antioxidant, viscosity modifier, pour point depressant, friction modifier, fluidity modifier, or anti-foam agent.

41. The method of claim 1 wherein said low-phosphorus or phosphorus-free lubricating oil composition has a sulfur content of up to about 250 ppm.

42. The method of claim 1 wherein said low-phosphorus or phosphorus-free lubricating oil composition has a chlorine content of no more than about 10 ppm.

43. A method of operating an internal combustion engine comprising a valve train, wherein the engine is equipped with an exhaust gas aftertreatment device, said method comprising:
(A) operating said engine using a normally liquid or gaseous fuel;
(B) lubricating components of said valve train using a solid film lubricant;
(C) lubricating said engine, including said components of said valve train, using a low-phosphorus or phosphorus-free lubricating oil composition;
(D) removing part of said low-phosphorus or phosphorus-free lubricating oil composition from said engine and said removed part of said low-phosphorus or phosphorus-free lubricating oil composition is being combined with said exhaust gas upstream of said exhaust gas aftertreatment device, said low-phosphorus or phosphorus-free lubricating oil composition being characterized by the absence of an extreme-pressure additive comprised of metal and phosphorus; and
(E) adding an additional amount of said low-phosphorus or phosphorus-free lubricating oil composition to said engine to replace said removed part of said low-phosphorus or phosphorus-free lubricating oil composition.

44. A method of operating an internal combustion engine comprising a valve train, said method comprising:
(A) operating said engine using a normally liquid or gaseous fuel;
(B) lubricating components of said valve train using a solid film lubricant; and
(C) lubricating said engine, including said components of said valve train, using a low-phosphorus or phosphorus-free lubricating oil composition, said low-phosphorus or phosphorus-free lubricating oil composition optionally containing an extreme-pressure additive comprised of metal and phosphorus, provided the amount of phosphorus contributed to said low-phosphorus or phosphorus-free lubricating oil composition by said extreme-pressure additive does not exceed about 0.08% by weight based on the weight of said low-phosphorus or phosphorus-free lubricating oil composition;
wherein one or more wear interfaces or contacts of the connecting rods of said engine are lubricated using said solid film lubricant.

45. A method of operating an internal combustion engine comprising a valve train, said method comprising:
(A) operating said engine using a normally liquid hydrocacbon fuel;
(B) lubricating components of said valve train using a solid film lubricant; and
(C) lubricating said engine, including said components of said valve train, using a low-phosphorus or phosphorus-free lubricating oil composition, said low-phosphorus or phosphorus-free lubricating oil composition comprising an acylated nitrogen-containing compound having a substituent of at least about 10 aliphatic carbon atoms, said low-phosphorus or phosphorus-free lubricating oil composition optionally containing an extreme-pressure additive comprised of metal and phosphorus provided the amount of phosphorus contributed to said low-phosphorus or phosphorus-free lubricating oil composition by said extreme-pressure additive does not exceed about 0.08% by weight based on the weight of said low-phosphorus or phosphorus-free lubricating oil composition.

46. A method of operating an internal combustion engine comprising a valve train, said method comprising:
(A) operating said engine using a normally liquid hydrocarbon fuel;
(B) lubricating components of said valve train using a solid film lubricant;
(C) lubricating said engine, including said components of said valve train, using a low-phrusphorus or phosphorus-free lubricating oil composition, said low-phosphorus or phosphorus-free lubricating oil composition comprising an acylated nitrogen-containing compound having a substituent of at least about 10 aliphatic carbon atoms, said low-phosphorus or phosphorus-free lubricating oil composition being characterized by the absence of extreme-pressure additives comprised of metal and phosphorus;
(D) removing part of said low-phosphorus or phosphorus-free lubricating oil composition from said engine, said removed part of said low-phosphorus or phosphorus-free lubricating oil composition (i) being combined with said fuel and consumed with said fuel as said engine is operated or (ii) being combined with the exhaust gas from said engine and removed from said engine with said exhaust gas; and
(E) adding an additional amount of said low-phosphorus or phosphorus-free lubricating oil composition to said engine to replace said removed part of said low-phosphorus or phosphorus-free lubricating oil composition.

47. A method of operating a spark ignition internal combustion engine comprising a valve train and being equipped with an exhaust gas aftertreatment device, said method comprising:

(A) operating said engine using a gasoline fuel composition;

(B) lubricating components of said valve train using a solid film lubricant;

(C) lubricating said engine, including said components of said valve train, using a low-phosphorus or phosphorus-free lubricating oil composition, said low-phosphorus or phosphorus-free lubricating oil composition being characterized by the absence of extreme-pressure additives comprised of metal and phosphorus;

(D) removing part of said low-phosphorus or phosphorus-free lubricating oil composition from said engine, said removed part of said low-phosphorus or phosphorus-free lubricating oil composition (i) being combined with said fuel composition and consumed with said fuel composition as said engine is operated or (ii) being combined with the exhaust gas from said engine upstream of said exhaust gas aftertreatment device and removed from said engine with said exhaust gas; and (E) adding an additional amount of said low-phosphorus or phosphorus-free lubricating oil composition to said engine to replace said removed part of said low-phosphorus or phosphorus-free lubricating oil composition.

48. A method of operating a compression ignition internal combustion engine comprising a valve train, said method comprising:

(A) operating said engine using a diesel fuel composition;

(B) lubricating components of said valve train using a solid film lubricant;

(C) lubricating said engine, including said components of said valve train, using a low-phosphorus or phosphorus-free lubricating oil composition;

(D) removing part of said low-phosphorus or phosphorus-free lubricating oil composition from said engine, said removed part of said low-phosphorus or phosphorus-free lubricating oil composition (i) being combined with said fuel composition and consumed with said fuel composition as said engine is operated or (ii) being combined with the exhaust gas from said engine and removed from said engine with said exhaust gas; and (E) adding an additional amount of said low-phosphorus or phosphorus-free lubricating oil composition to said engine to replace said removed part of said low-phosphorus or phosphorus-free lubricating oil composition.

* * * * *